United States Patent
Takada et al.

(10) Patent No.: US 12,040,841 B2
(45) Date of Patent: Jul. 16, 2024

(54) COMMUNICATION APPARATUS AND POWER USE METHOD

(71) Applicant: Nippon Telegraph and Telephone Corporation, Tokyo (JP)

(72) Inventors: Hidetoshi Takada, Musashino (JP); Hiroshi Inoue, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 132 days.

(21) Appl. No.: 17/761,812

(22) PCT Filed: Sep. 18, 2019

(86) PCT No.: PCT/JP2019/036632
§ 371 (c)(1),
(2) Date: Mar. 18, 2022

(87) PCT Pub. No.: WO2021/053768
PCT Pub. Date: Mar. 25, 2021

(65) Prior Publication Data
US 2022/0393774 A1    Dec. 8, 2022

(51) Int. Cl.
*H04B 10/80* (2013.01)
*H04B 10/25* (2013.01)

(52) U.S. Cl.
CPC .......... *H04B 10/807* (2013.01); *H04B 10/25* (2013.01)

(58) Field of Classification Search
CPC .............................. H04B 10/807; H04B 10/25
USPC .................................................. 398/171, 141
See application file for complete search history.

(56) References Cited

U.S. PATENT DOCUMENTS

| | | | | |
|---|---|---|---|---|
| 5,504,606 A | * | 4/1996 | Frigo | H04B 10/807 398/58 |
| 7,359,647 B1 | * | 4/2008 | Faria | H04B 10/807 455/343.1 |
| 2006/0188266 A1 | * | 8/2006 | Vrla | H04L 12/10 398/171 |
| 2008/0235418 A1 | * | 9/2008 | Werthen | H04B 10/807 710/106 |
| 2009/0238559 A1 | * | 9/2009 | Pfeiffer | H04Q 11/0067 398/58 |

(Continued)

FOREIGN PATENT DOCUMENTS

JP    2007011987 A  *  1/2007
JP    2007102637 A  *  4/2007

(Continued)

OTHER PUBLICATIONS

[No Author Listed] [online], "FLET'S Hikari Next Support Information," FLET'S Hikari, NTT East Official Homepage for individual customers, retrieved on Aug. 22, 2019, retrieved from URL <https://flets.com/customer/next/access/connect/mansion/vdsl.html>, 5 pages (with English Translation).

*Primary Examiner* — Li Liu
(74) *Attorney, Agent, or Firm* — Fish & Richardson P.C.

(57) ABSTRACT

A communication apparatus for performing communication via an optical fiber includes a photoelectric converter configured to convert an optical signal input from the optical fiber into electricity through photoelectric conversion, and a functional unit configured to operate using the electricity converted from the optical signal by the photoelectric converter.

15 Claims, 8 Drawing Sheets

(56) References Cited

U.S. PATENT DOCUMENTS

| | | | | |
|---|---|---|---|---|
| 2012/0063770 A1* | 3/2012 | Tsuji | ................... | H04B 10/27 |
| | | | | 398/25 |
| 2012/0063780 A1* | 3/2012 | Greenberg | ........... | H04B 10/272 |
| | | | | 398/58 |
| 2014/0334824 A1* | 11/2014 | Goldner | ............... | H04B 10/807 |
| | | | | 398/116 |
| 2017/0272157 A1* | 9/2017 | Crowne | ................. | G01D 21/02 |
| 2019/0379952 A1* | 12/2019 | Iannone | ............. | H04Q 11/0005 |

FOREIGN PATENT DOCUMENTS

| | | |
|---|---|---|
| JP | 2008311916 | 12/2008 |
| JP | 2010011339 | 1/2010 |
| JP | 2017098643 | 6/2017 |
| JP | 2017098643 A * | 6/2017 |

* cited by examiner

COMMUNICATION APPARATUS AND POWER USE METHOD

CROSS-REFERENCE TO RELATED APPLICATIONS

This application is a National Stage application under 35 U.S.C. § 371 of International Application No. PCT/JP2019/036632, having an International Filing Date of Sep. 18, 2019, the disclosure of which is considered part of the disclosure of this application, and is incorporated in its entirety into this application.

TECHNICAL FIELD

The present invention relates to a communication apparatus that transmits and/or receives optical signals via optical fibers.

BACKGROUND ART

Optical access technologies that make high speed and large capacity information communication services available by accessing the Internet and a communication carrier network with optical fibers have become widespread.

In such an optical access technology, an information communication apparatus called a home gateway (HGW) is typically installed in a user's home like a general residence, and the HGW is connected to an optical fiber extending from a communication carrier station to the user's home. Note that, here, an optical line terminal (ONU)-integrated HGW is assumed.

CITATION LIST

Non Patent Literature

NPL 1: Internet URL https://flets.com/customer/next/access/connect/mansion/vdsl.html, retrieved on Aug. 22, 2019

SUMMARY OF THE INVENTION

Technical Problem

An HGW generally includes a router function unit, a wireless connection function unit, a LAN connection function unit, and the like. Electricity is required to drive each of the functional units of the HGW, and thus the HGW is not able to operate when no electricity is supplied from a commercial power source.

For example, if the HGW does not operate when there is a power outage due to a certain problem, the user is not able to obtain information of the problem from the network and needs to wait for recovery from the power outage. Such a problem is not limited to an HGW, and is a problem that can arise in all communication apparatuses for performing communication via optical fibers.

The present invention has been conceived in view of the above-described circumstances, and aims to provide a technique that enables a communication apparatus for performing communication via optical fibers to operate even without supply of electricity from a commercial power source.

Means for Solving the Problem

According to the disclosed technique, a communication apparatus for performing communication via an optical fiber is provided. The communication apparatus includes: a photoelectric converter configured to convert an optical signal input from the optical fiber into electricity through photoelectric conversion; and a functional unit configured to operate using the electricity converted from the optical signal by the photoelectric converter.

Effects of the Invention

According to the disclosed technique, a technique that enables a communication apparatus for performing communication via an optical fiber to operate even without supply of electricity from a commercial power source is provided.

DESCRIPTION OF EMBODIMENTS

Hereinafter, embodiments of the present invention (present embodiments) will be described with reference to the drawings. The embodiments to be described below are merely exemplary and embodiments to which the present invention is applied are not limited to the following embodiments.

Although an ONU-integrated HGW is employed as an example of a communication apparatus to which the present invention is applied below, the communication apparatus to which the present invention is applied is not limited to an ONU-integrated HGW. For example, even when a configuration in which an ONU and an HGW are physically separated is used, the ONU and the HGW may be regarded as an HGW according to the present embodiment and the technique to be described below can be applied thereto.

In addition, the present invention can be applied, without being limited to the optical access technique to be described below. The present invention can be applied to any apparatus installed at an end point of an optical fiber that receives optical signals at all times.

Example of Overall System Configuration

Figure 1:
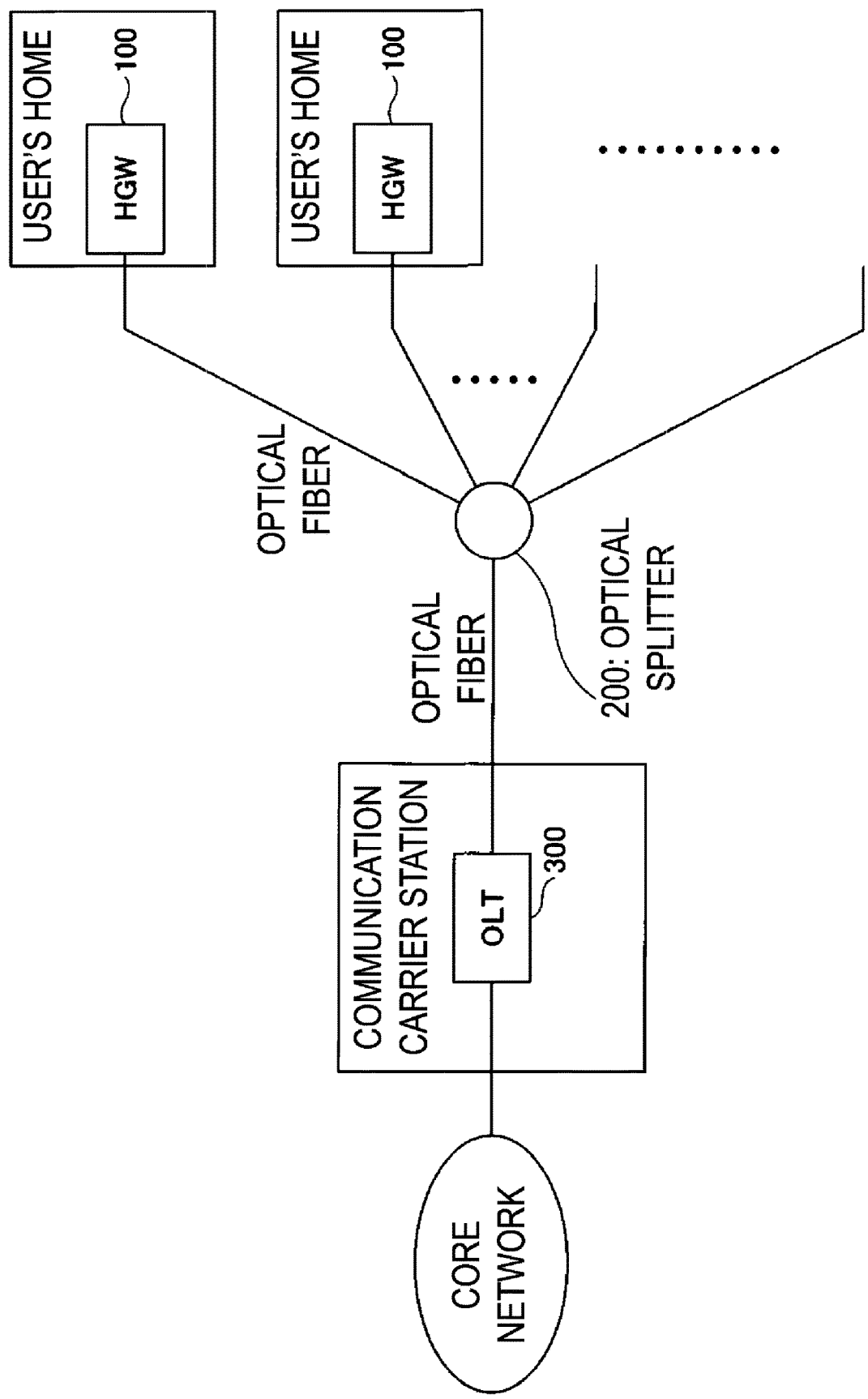
FIG. 1 is a diagram illustrating an example of an overall configuration of a communication system according to an embodiment of the present invention.

FIG. 1 illustrates an example of an overall configuration of a communication system according to an embodiment of the present invention. The communication system according to the embodiment of the present invention is a passive optical network (PON) type optical access system, as illustrated in FIG. 1, employed by many optical access systems.

In this communication system, an optical fiber between an optical line terminal (OLT) 300 installed in a communication carrier station and HGWs 100 installed in user's homes is split using an optical splitter 200 to make one-to-multiple connection. A home network is configured on the indoor side of each HGW 100, and various information devices such as a PC, a VoIP terminal, a TV, and the like can connect to the home network.

In addition, a time division multiple access (TDMA) scheme is employed, and each HGW 100 performs transmission and/or reception at different time slots. In particular, in downlink communication, although the same signal is transferred to all of the HGWs 100 connected to the same PON via the optical splitter 200, each HGW 100 extracts only data destined for itself and discards the other data. Note that wavelength division multiplexing (WDM) enables both uplink and downlink communication with one optical fiber. Each HGW 100 receives optical signals including optical signals destined for the other HGWs 100, optical signals for monitoring, and the like, all the times.

Note that, the one-to-multiple configuration as illustrated in FIG. 1 is an example. A configuration in which one OLT corresponds to one HGW may be used.

The HGWs 100 of the present embodiment utilize an optical signal input from the optical fiber as a source of electricity for environmental electricity generation, stores the electricity in an electricity storage unit through photoelectric conversion, and drives each of the functional units with the electricity stored in the electricity storage unit when the HGWs 100 are in operating states. When the electricity consumed by an HGW 100 in a standby state per unit time is smaller than the electricity stored in the electricity storage unit (electricity obtained from photoelectric conversion), the difference is stored in the electricity storage unit.

Hereinafter, a first to third embodiments will be described as specific examples of the HGW 100. Note that, although an example in which an electricity storage unit 170 is used will be described in the first to third embodiments, they are merely an example. For example, in the configurations of the first and third embodiments, the HGW 100 may be driven by supplying the electricity obtained by a photoelectric converter 150 to each functional unit with no need to provide the electricity storage unit 170 in the HGW 100.

First Embodiment

Figure 2:
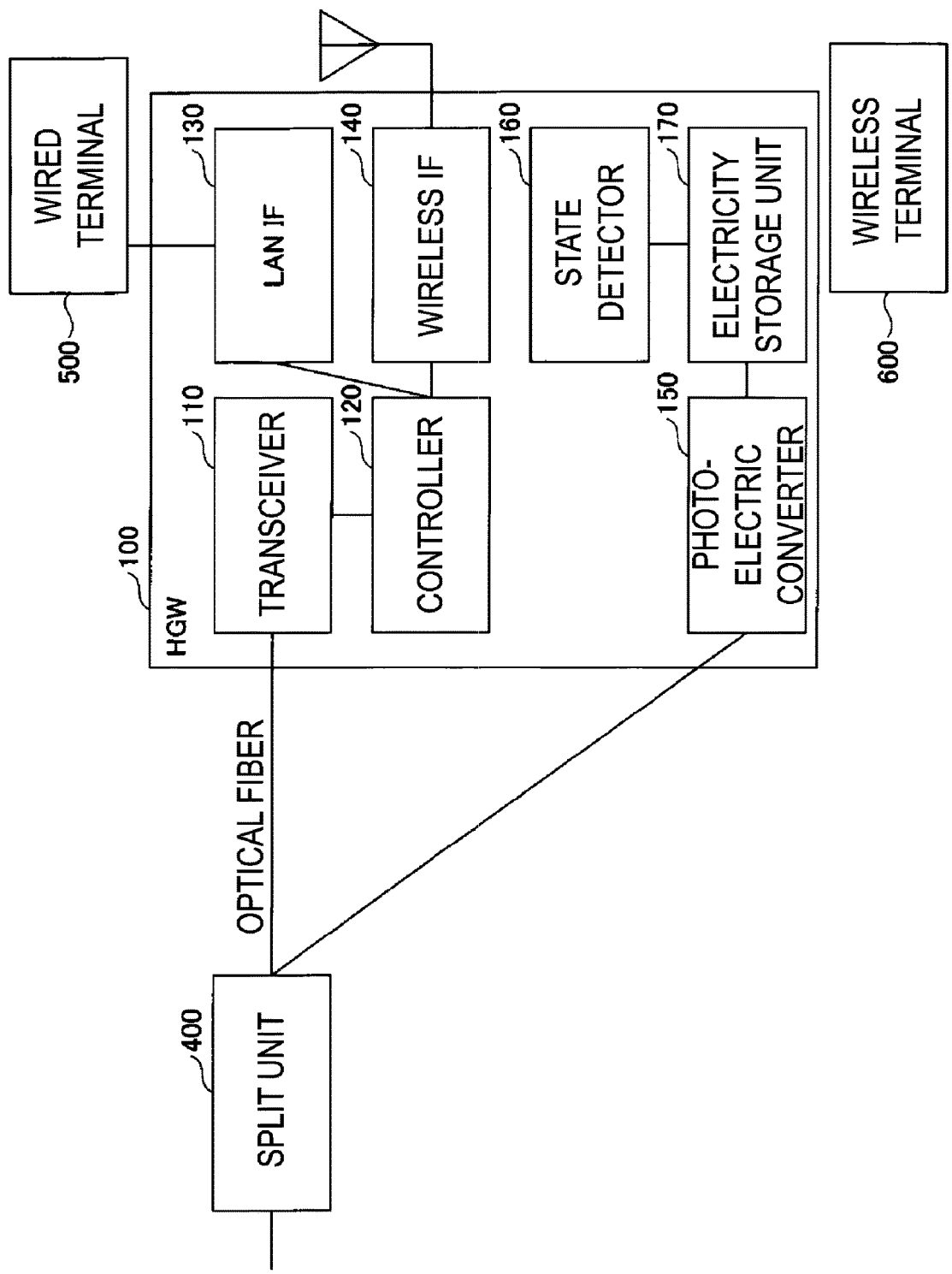
FIG. 2 is a configuration diagram of an HGW according to a first embodiment.

FIG. 2 is a configuration diagram of an HGW 100 according to a first embodiment. The HGW 100 of the first embodiment includes a transceiver 110, a controller 120, a LAN-IF 130, a wireless IF 140, the photoelectric converter 150, a state detector 160, and the electricity storage unit 170 as illustrated in FIG. 2. In FIG. 2, a wired terminal 500 connected to the LAN-IF 130 and a wireless terminal 600 that performs wireless communication using the wireless IF 140 are illustrated.

Two optical fibers are connected to the HGW 100 as illustrated in FIG. 1, one of which is a communication optical fiber connected to the transceiver 110 and the other of which is an electricity supply optical fiber connected to the photoelectric converter 150. Note that connecting the two optical fibers to the HGW 100 is an example. Three or more optical fibers may be used depending on the required electricity. For example, two or more optical fibers may be connected to the photoelectric converter 150.

The electricity supply optical fiber connected to the photoelectric converter 150 may be an optical fiber having an optical amplification function.

A split unit (optical splitter) 400 to branch into two optical fibers is provided as illustrated in FIG. 2. The split unit 400 may be the optical splitter 200 illustrated in FIG. 1 or may be connected to one optical fiber split by the optical splitter 200.

However, using the split unit 400 is an example. Each of the communication optical fiber connected to the transceiver 110 and the electricity supply optical fiber connected to the photoelectric converter 150 may be an optical fiber extending directly from a communication carrier station.

Although a conventional HGW is connected to an optical fiber and connected to a commercial power source to receive electricity, the HGW 100 of the first embodiment is not connected to a commercial power source. The function of each functional unit is as follows.

The transceiver 110 performs reception processing, such as demodulation processing, on a signal input from the optical fiber, and outputs the signal obtained from the reception processing to the controller 120. In addition, the transceiver 110 performs transmission processing, such as modulation processing, on a signal input from the controller 120, and outputs the signal obtained from the transmission processing to the optical fiber. Note that the transceiver 110 may be an ONU built into the HGW 100.

The controller 120 relays signals between each of the transceiver 110, the LAN-IF 130, and the wireless IF 140. The controller 120 may have a router function. For example, the controller 120 determines the destination of a signal received from the transceiver 110 and outputs the signal to the LAN-IF 130 if the signal is destined for the wired terminal 500. Note that the reception-processed signal and the signal to be transmission-processed may be referred to as a packet, a frame, data, and the like.

The LAN-IF 130 exchanges signals with the wired terminal 500. For example, the LAN-IF 130 outputs a signal received from the wired terminal 500 and destined for a core network to the controller 120. The wireless IF 140 exchanges radio signals with the wireless terminal 600.

The photoelectric converter 150 receives input of optical signals at all times from the optical fiber connected to the photoelectric converter 150. The photoelectric converter 150 converts the input optical signals into electricity using the photoelectric effect, supplies the resulting electricity to each functional unit, and outputs the excess electricity to the electricity storage unit 170.

In the first embodiment (the same applies to the second and third embodiments and the configuration without the electricity storage unit 170), functional units that receive supply of electricity from the photoelectric converter 150 or the electricity storage unit 170 are functional units required for the HGW 100 to perform a communication operation, and the units are the transceiver 110, the controller 120, the LAN-IF 130, the wireless IF 140, the state detector 160, and a switch 180 (in the second embodiment) in the example of FIG. 2. However, when no terminal is connected to the LAN-IF 130, the LAN-IF 130 does not need to receive the supply of electricity, and when no terminal performing wireless communication is used, the wireless IF 140 does not need to receive the supply of electricity. In addition, when the HGW 100 does not perform communication at all, the transceiver 110, the controller 120, the LAN-IF 130, and the wireless IF 140 do not need to receive the supply of electricity.

The state detector 160 detects a state of the HGW 100 (a standby state or an operating state). As a method of state detection, for example, there is a method in which, when the controller 120 detects that a terminal connected to the HGW 100 has started (or finished) exchanging signals, the controller 120 notifies the state detector 160 of the detection.

The state detector 160 instructs the electricity storage unit 170 to discharge electricity when the state detector detects that the HGW 100 has entered an operating state from a standby state.

The electricity storage unit 170 stores the electricity input from the photoelectric converter 150 while the HGW 100 is in the standby state. On the other hand, when the electricity storage unit is instructed from the state detector 160 to discharge electricity based on the fact that the HGW 100 has entered the operating state, electricity is supplied to each of the functional units.

In the first embodiment (the same applies to the second and third embodiments and the configuration without the electricity storage unit 170), each of the transceiver 110, the controller 120, the LAN-IF 130, the wireless IF 140, the photoelectric converter 150, the state detector 160, and the switch 180 (in the second embodiment) is implemented, for example, by an integrated circuit (IC) including a processor and a memory (and, if needed, an optical component for optical signal processing). In addition, in the first embodiment (the same applies to the second and third embodiments and the configuration without the electricity storage unit 170), the HGW 100 may be implemented by executing a program that realizes each function on a general-purpose computer including a CPU and a memory.

Operation Flow

Figure 3:
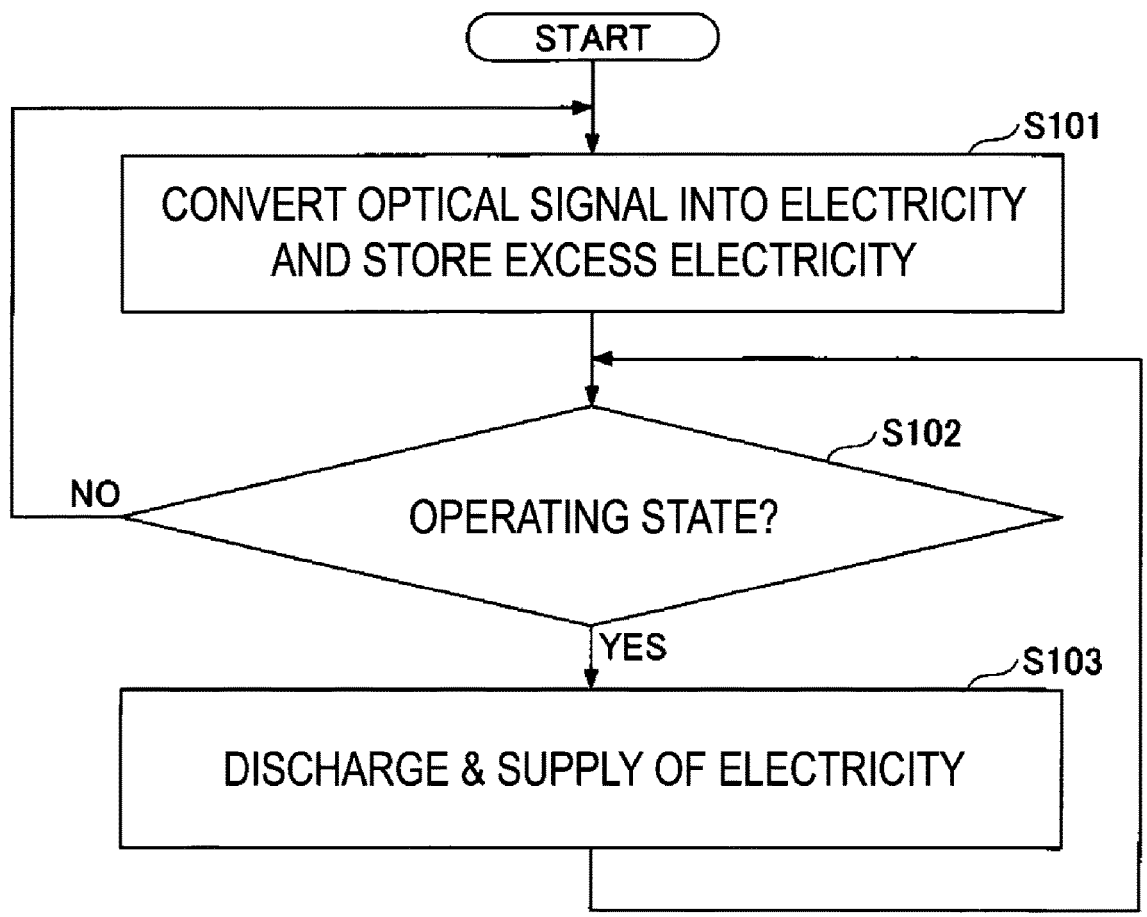
FIG. 3 is a flowchart for describing an operation of the HGW according to the first embodiment.

FIG. 3 is a flowchart for describing an operation example of the HGW 100 according to the first embodiment. It is assumed that the HGW 100 is in a standby state at the start of FIG. 3.

In S101, the photoelectric converter 150 converts an input optical signal into electricity using the photoelectric effect, supplies the resulting electricity to each functional unit, and outputs the excess electricity to the electricity storage unit 170. Here, because the HGW is in the standby state, the amount of electricity supplied to each functional unit is small or zero, excess electricity is generated, and it is stored in the electricity storage unit 170.

In S102, the state detector 160 determines the state of the HGW 100. If the state detector 160 determines that the state of the HGW 100 is the standby state (No in S102), the process returns to S101, and the excess electricity is stored in the electricity storage unit 170. Note that, when the operating state shifts to the standby state, the state detector 160 instructs the electricity storage unit 170 to stop discharging.

In S102, if the state detector 160 determines that the state of the HGW 100 is an operating state (Yes in S102), the state detector 160 proceeds to S103, instructs the electricity storage unit 170 to discharge electricity, and the electricity is supplied from the electricity storage unit 170 to each of the functional units. In addition, electricity converted from the optical signal by the photoelectric converter 150 is also supplied to each of the functional units. In the state of S103 (operating state), if there is excess electricity converted from the optical signal by the photoelectric converter 150, the electricity is stored in the electricity storage unit 170.

The determination of S102 may be performed periodically or may be triggered by change of the state. Each of the operations of S101 and S103 is continued if there is no change in the states.

Second Embodiment

Figure 4:
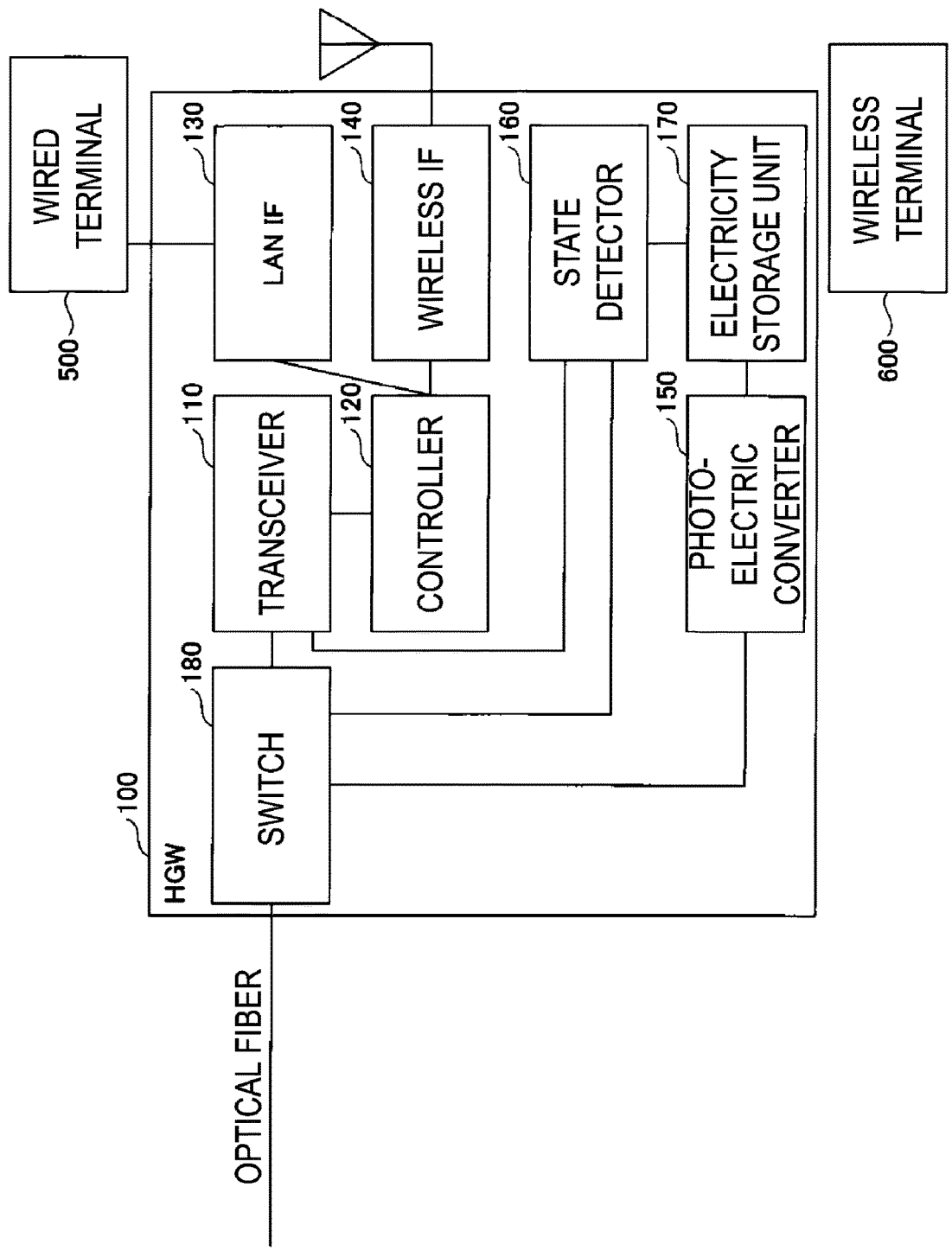
FIG. 4 is a configuration diagram of an HGW according to a second embodiment.

Next, the second embodiment will be described. FIG. 4 is a configuration diagram of an HGW 100 according to the second embodiment. The HGW 100 of the second embodiment includes a transceiver 110, a controller 120, a LAN-IF 130, a wireless IF 140, a photoelectric converter 150, a state detector 160, an electricity storage unit 170, and a switch 180 as illustrated in FIG. 2. A wired terminal 500 connected to the LAN-IF 130 and a wireless terminal 600 that performs wireless communication using the wireless IF 140 are illustrated in FIG. 4, as in the first embodiment.

The HGW 100 of the second embodiment is connected to one optical fiber as illustrated in FIG. 4. The single optical fiber is split into two optical fibers (which may be two waveguides) by the switch 180, one of which is connected to the transceiver 110 and the other is connected to the photoelectric converter 150.

The controller 120, the LAN-IF 130, the wireless IF 140, the photoelectric converter 150, and the electricity storage unit 170 are the same as the corresponding functional units of the first embodiment. However, the photoelectric converter 150 is connected to an optical fiber extending from the switch 180 as described above.

In addition to the functions described in the first embodiment, the transceiver 110 has the function of demodulating an optical signal received from an OLT 300 side and obtaining information of the time allocated for its transmission and reception. The obtained information is passed to the state detector 160.

For example, in TDMA-type communication, the transceiver 110 acquires the timing of its transmission time slot and reception time slot from the optical signal received from the OLT 300 side.

The state detector 160 causes the functional units that do not need to operate to sleep for a time in which the HGW 100 does not need to perform transmission and/or reception based on the information of the time allocated for transmission and/or reception. Note that the sleep is a state in which electricity is not consumed.

In addition, the state detector 160 instructs the switch 180 to output an optical signal to the photoelectric converter 150 for a time in which the HGW 100 does not need to perform transmission and/or reception. Note that the instruction to the switch 180 may be given as a switching instruction at a switching timing, or may indicate a switching timing so that transmission and/or reception can be performed at the transmission time slot and reception time slot of the HGW. In the latter case, the switch 180 detects a switching timing to switch.

Figure 5:
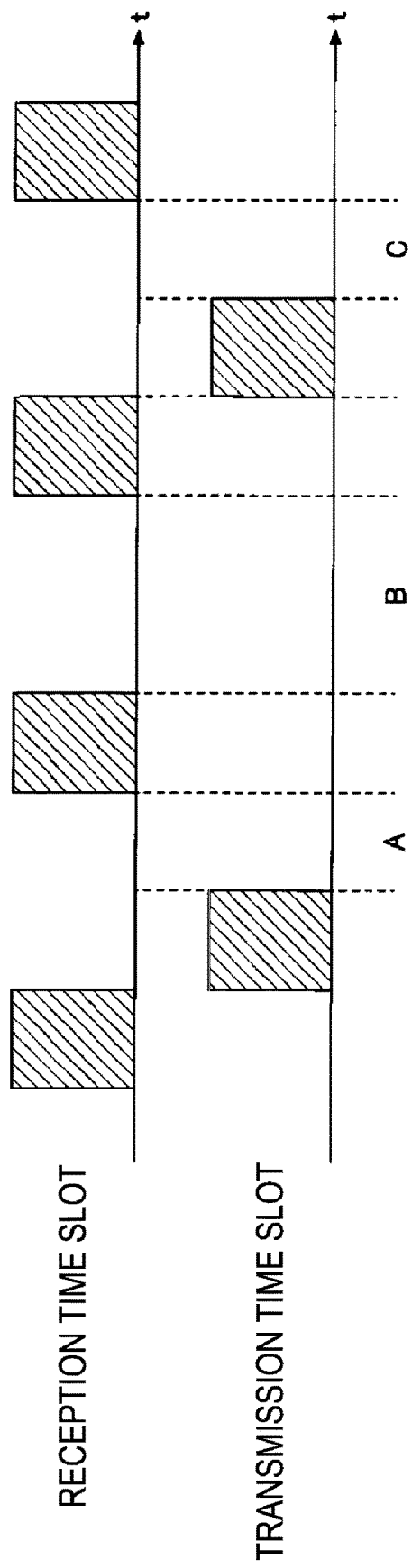
FIG. 5 is a diagram illustrating an image of time slots.

For example, it is assumed that transmission time slots and reception time slots are allocated to the HGW 100 as illustrated in FIG. 5. In this case, because the HGW does not need to perform transmission and/or reception in each of the periods indicated by A, B, and C, an optical signal is output to the photoelectric converter 150 and functional units that do not need to operate are caused to sleep.

The switch 180 outputs signals input from the optical fiber to the photoelectric converter 150 in the period indicated by the transceiver 110.

Operation Flow

Figure 6:
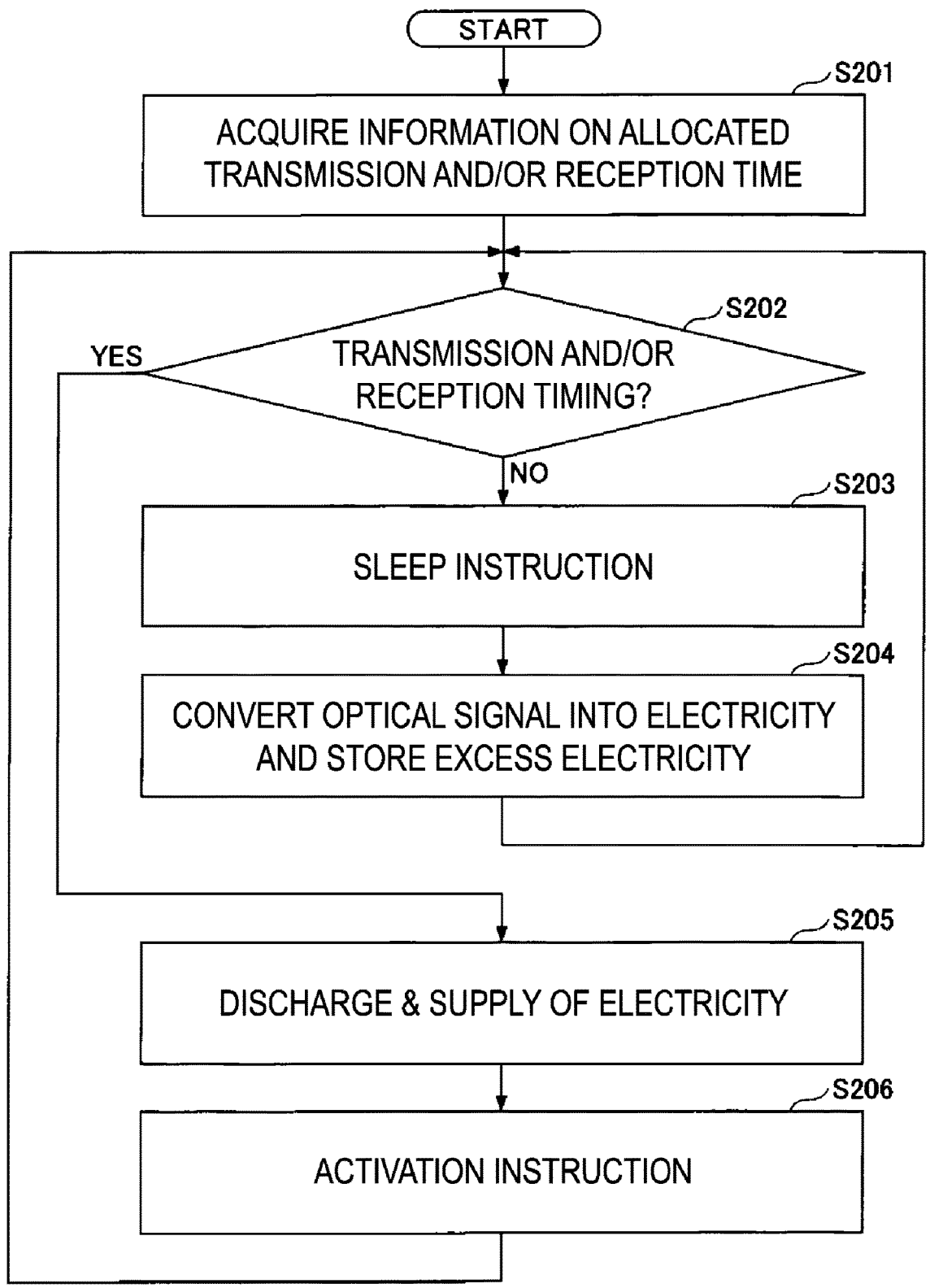
FIG. 6 is a flowchart for describing an operation of the HGW according to the second embodiment.

FIG. 6 is a flowchart for describing an operation example of the HGW 100 according to the second embodiment. FIG. 6 is based on the assumption that, once information of a time for transmission and/or reception allocated to the HGW is acquired, the information is periodically applied. In addition, a control method in which the state detector 160 instructs the switch 180 to perform a switching is assumed.

In S201, the transceiver 110 acquires information of a time for transmission and/or reception allocated to the HGW from a received optical signal and notifies the state detector 160 of the information of the time. In S202, the state detector 160 determines whether the current time is a transmission/reception timing based on the information acquired in S201.

If the current time is not a transmission and/or reception timing (No in S202), the state detector 160 proceeds to S203 and instructs a functional unit that does not need to operate to sleep. Note that, if the sleep instruction has already been issued and then a period without a transmission and/or reception timing continues, the sleep instruction may not be issued again.

Further, in S204, the transceiver 110 instructs the switch 180 to output an optical signal to the photoelectric converter 150. Thus, the photoelectric converter 150 converts the received optical signal into electricity, supplies it to each functional unit, and causes the excess electricity to be stored in the electricity storage unit 170. Note that, if the instruction to output the optical signal has already been issued to the photoelectric converter 150 and then a period without a transmission and/or reception timing continues, the instruction may not be issued again. After S204, the process returns to S202.

In S202, if the current time is a transmission and/or reception timing (Yes in S202), the state detector 160 proceeds to S205 and instructs the electricity storage unit 170 to discharge electricity. As a result, electricity is supplied to each of the functional units.

In S206, the state detector 160 instructs the functional unit that has received the sleep instruction to be activated and the switch 180 to output an optical signal to the transceiver 110. Note that, if these instructions have already been issued and then a period with a transmission and/or reception timing continues, the instruction may not be issued again. After S206, the process returns to S202. The determination of S202 may be performed periodically, or may be performed at a switching timing with or without transmission and/or reception.

The second embodiment has the advantage that communication and supply of electricity can be provided by only one optical fiber.

Third Embodiment

Figure 7:
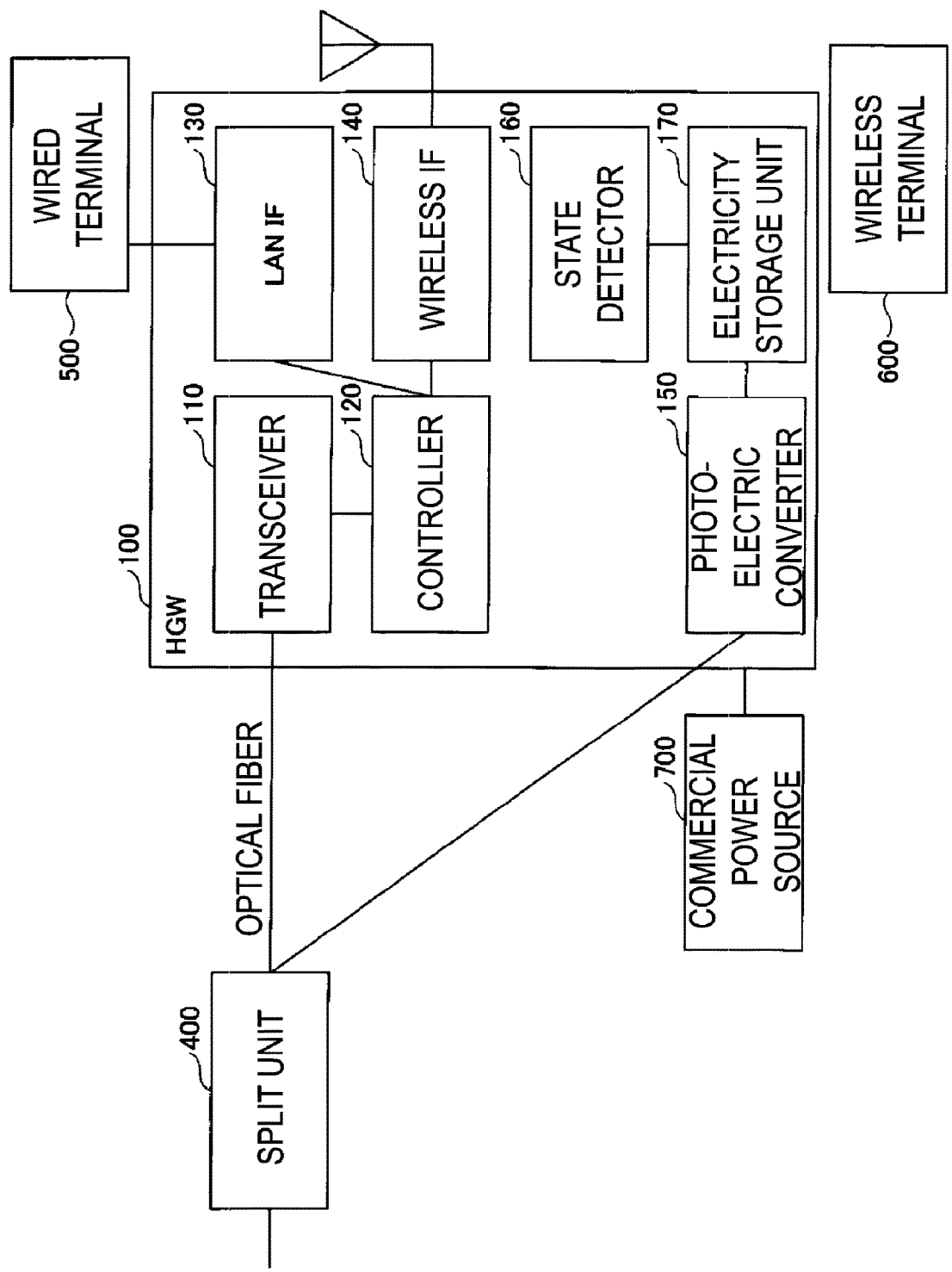
FIG. 7 is a configuration diagram of an HGW according to a third embodiment.

Next, the third embodiment will be described. FIG. 7 is a configuration diagram of an HGW 100 according to the third embodiment. The HGW 100 of the third embodiment has a configuration in which a commercial power source 700 is connected to the HGW 100 of the first embodiment, as illustrated in FIG. 7. Functions of each functional unit of the HGW 100 in the third embodiment are basically the same as the functions of each functional unit of the HGW 100 of the first embodiment. However, because the commercial power source 700 is used, the HGW 100 of the third embodiment operates differently from that of the first embodiment as described below.

The HGW 100 of the third embodiment drives each functional unit with supply of electricity from the commercial power source 700 in normal times. In the event of a power outage, each functional unit is driven with supply of electricity from the photoelectric converter 150 and the electricity storage unit 170. Note that, in the event of a power outage, each functional unit may be driven with supply of electricity only from the photoelectric converter 150 or only from the electricity storage unit 170.

In normal times, the photoelectric converter 150 outputs electricity obtained in photoelectric conversion from the optical signal received with the optical fiber to the electricity storage unit 170, and the electricity storage unit 170 stores the electricity output from the photoelectric converter 150.

The state detector 160 monitors the electricity supplied from the commercial power source 700. When the electricity is below a threshold, the state detector instructs the photoelectric converter 150 to supply electricity to each of the functional units and instructs the electricity storage unit 170 to discharge electricity.

This technique of the third embodiment in which the electricity discharged from the electricity storage unit 170 is used when the electricity of the commercial power source is below the threshold may be applied to the second embodiment.

Operation Flow

Figure 8:
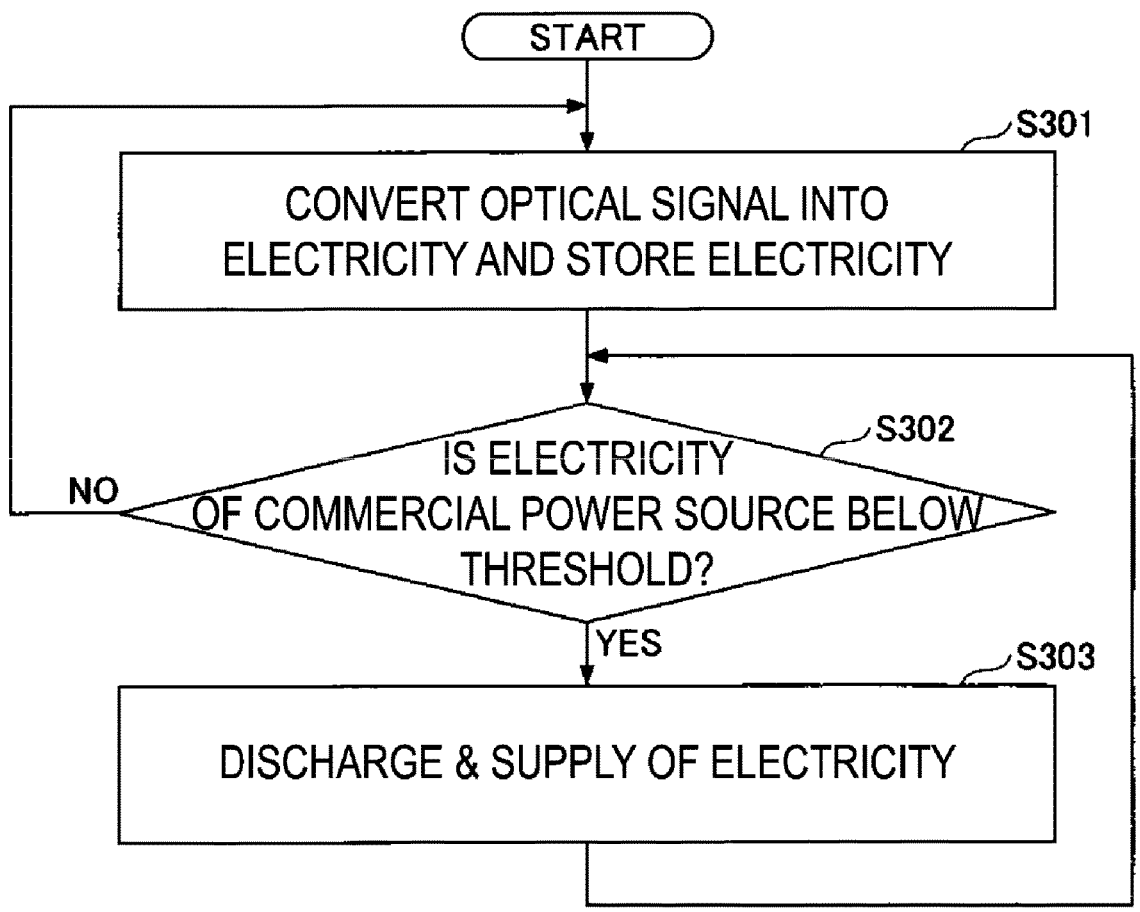
FIG. 8 is a flowchart for describing an operation of the HGW according to the third embodiment.

FIG. 8 is a flowchart for describing an operation example of the HGW 100 according to the third embodiment. It is assumed that the commercial power source 700 has no abnormality at the start of FIG. 8.

In S301, the photoelectric converter 150 converts an input optical signal into electricity using the photoelectric effect, and outputs the obtained electricity to the electricity storage unit 170. In the third embodiment, because electricity is supplied to each of the functional units from the commercial power source 700 in normal times, all electricity obtained by the photoelectric converter 150 is output to the electricity storage unit 170.

In S302, the state detector 160 determines whether the electricity supplied from the commercial power source 700 is below a threshold. If the state detector 160 does not determine that the electricity supplied from the commercial power source 700 is below the threshold (No in S302), the state detector 160 returns to S301 and stores electricity in the electricity storage unit 170.

In S302, if the state detector 160 determines that the electricity supplied from the commercial power source 700 is below the threshold (Yes in S302), the state detector 160 proceeds to S303, instructs the electricity storage unit 170 to discharge electricity, and thus the electricity is supplied from the electricity storage unit 170 to each of the functional units. In addition, electricity converted from the optical signal by the photoelectric converter 150 is also supplied to each of the functional units. Although it is assumed that an excess of the electricity converted from the optical signal by the photoelectric converter 150 is not generated in the state of S303, if there is an excess, it is stored in the electricity storage unit 170 and discharged simultaneously.

The determination of S302 may be performed periodically or may be triggered by change of the state. In addition, the operations of S301 and S303 are performed continuously if there is no change in the state.

SUMMARY OF EMBODIMENTS

According to the present embodiments, at least a communication apparatus and an electricity use method described in each paragraph below are provided.

Item 1

A communication apparatus for performing communication via an optical fiber, the communication apparatus including:
- a photoelectric converter configured to convert an optical signal input from the optical fiber into electricity through photoelectric conversion; and
- a functional unit configured to operate using the electricity converted from the optical signal by the photoelectric converter.

Item 2

The communication apparatus according to item 1, further including:
- an electricity storage unit configured to store the electricity converted from the optical signal by the photoelectric converter.

Item 3

The communication apparatus according to item 1 or 2, further including:
- a transceiver connected to a first optical fiber and configured to transmit and/or receive an optical signal through the first optical fiber,
- wherein the photoelectric converter is connected to one or more second optical fibers and converts an optical signal input from the second optical fibers into electricity.

Item 4

The communication apparatus according to item 2, further including:
- a state detector configured to instruct the electricity storage unit to discharge electricity when it is detected that a state of the communication apparatus has shifted from a standby state to an operating state.

Item 5

The communication apparatus according to item 1 or 2, further including:
- a switch configured to output an optical signal input from an optical fiber connected to the communication apparatus to a transceiver or the photoelectric converter included in the communication apparatus; and
- a state detector configured to instruct the switch to switch an output destination of the optical signal based on information of a time allocated to the communication apparatus for transmission and/or reception.

Item 6

A communication apparatus for performing communication via an optical fiber, the communication apparatus including:
- a photoelectric converter configured to convert an optical signal input from the optical fiber into electricity through photoelectric conversion;
- an electricity storage unit configured to store the electricity converted from the optical signal by the photoelectric converter; and
- a functional unit configured to operate using the stored electricity discharged from the electricity storage unit when electricity from a commercial power source that supplies electricity to the communication apparatus is below a threshold.

Item 7

The communication apparatus according to item 6, further including:
- a state detector configured to monitor the electricity supplied from the commercial power source and instruct the electricity storage unit to discharge the stored electricity when it is detected that the electricity is below the threshold.

Item 8

An electricity use method performed by a communication apparatus including a photoelectric converter and an electricity storage unit to perform communication via an optical fiber, the electricity use method including:
- converting, by the photoelectric converter, an optical signal input from the optical fiber into electricity through photoelectric conversion;
- storing, by the electricity storage unit, the electricity converted from the optical signal by the photoelectric converter; and
- performing communication using the stored electricity discharged from the electricity storage unit when the communication apparatus is in a state of communication.

Item 9

An electricity use method performed by a communication apparatus including a photoelectric converter and an electricity storage unit to perform communication via an optical fiber, the electricity use method including:
- converting, by the photoelectric converter, an optical signal input from the optical fiber into electricity through photoelectric conversion;
- storing, by the electricity storage unit, the electricity converted from the optical signal by the photoelectric converter; and
- performing communication using the stored electricity discharged from the electricity storage unit when electricity from a commercial power source that supplies electricity to the communication apparatus is below a threshold.

Effects of Embodiments

According to the present embodiments, a commercial power source for driving the HGW is unnecessary as described above, and thus a user can perform communication in the event of a power outage, or the like, which enables information such as a trouble to be collected.

Although the present embodiments have been described above, the present invention is not limited to such specific embodiments, and various modifications and changes can be made within the scope of the gist of the present invention described in the claims.

REFERENCE SIGNS LIST

100 HGW
110 Transceiver
120 Controller

130 LAN-IF
140 Wireless IF
150 Photoelectric converter
160 State detector
170 Electricity storage unit
180 Switch
200 Optical splitter
300 OLT
400 Split unit
500 Wired terminal
600 Wireless terminal
700 Commercial power source

The invention claimed is:

1. A communication apparatus for performing communication via an optical fiber, the communication apparatus comprising:
 a transceiver;
 a photoelectric converter configured to perform photoelectric conversion;
 a functional unit, implemented using one or more computing devices, configured to operate using electricity from the photoelectric converter;
 a switch configured to output, to the transceiver or the photoelectric converter, an optical signal input from the optical fiber connected to the communication apparatus; and
 a state detector, implemented using one or more computing devices, configured to instruct the switch to switch an output destination of the optical signal based on information of a time allocated to the communication apparatus for transmission and/or reception,
 wherein the photoelectric converter is configured to convert the optical signal from the switch into electricity through the photoelectric conversion.

2. The communication apparatus according to claim 1, further comprising:
 an electricity storage unit configured to store the electricity converted from the optical signal by the photoelectric converter.

3. The communication apparatus according to claim 2, wherein the state detector is configured to determine whether current time is a transmission/reception timing based on the information of the time allocated to the communication apparatus for transmission and/or reception.

4. The communication apparatus according to claim 3, wherein the state detector is configured to, based on a determination that the current time is not the transmission/reception timing, instruct the functional unit to sleep.

5. The communication apparatus according to claim 4, wherein the transceiver is configured to instruct the switch to output the optical signal to the photoelectric converter to thereby cause the the photoelectric converter to covert the optical signal into the electricity, supply the electricity to the functional unit, and cause excess electricity to be stored in the electricity storage unit.

6. The communication apparatus according to claim 3, wherein the state detector is configured to, based on a determination that the current time is the transmission/reception timing, instruct the electricity storage unit to discharge the electricity to be supplied to the functional unit.

7. The communication apparatus according to claim 6, wherein the state detector is configured to instruct (i) the functional unit to be activated and (ii) the switch to output a next optical signal.

8. The communication apparatus according to claim 1, wherein the transceiver is configured to:
 acquire, from an optical signal received from the switch, the information of the time allocated to the communication apparatus for transmission and/or reception, and notify the state detector regarding the information.

9. An electricity use method performed by a communication apparatus including a transceiver, a photoelectric converter, a functional unit, a switch, a state detector, and an electricity storage unit to perform communication via an optical fiber, the electricity use method comprising:
 outputting, to the transceiver or the photoelectric converter, an optical signal input from the optical fiber connected to the communication apparatus;
 instructing the switch to switch an output destination of the optical signal based on information of a time allocated to the communication apparatus for transmission and/or reception;
 converting, by the photoelectric converter, the optical signal from the switch into electricity through photoelectric conversion;
 storing, by the electricity storage unit, the electricity converted from the optical signal by the photoelectric converter; and
 operating, by the functional unit, using the electricity converted from the optical signal by the photo electric converter.

10. The electricity use method according to claim 9, further comprising:
 acquiring, from an optical signal received from the switch, the information of the time allocated to the communication apparatus for transmission and/or reception, by the transceiver; and
 notifying, by the transceiver, the state detector regarding the information.

11. The electricity use method according to claim 9, further comprising:
 determining, by the state detector, whether current time is a transmission/reception timing based on the information of the time allocated to the communication apparatus for transmission and/or reception.

12. The electricity use method according to claim 11, further comprising:
 instructing, based on a determination that the current time is not the transmission/reception timing, the functional unit to sleep, by the state detector.

13. The electricity use method according to claim 12, further comprising:
 instructing, by the transceiver, the switch to output the optical signal to the photoelectric converter to thereby cause the the photoelectric converter to covert the optical signal into the electricity, supply the electricity to the functional unit, and cause excess electricity to be stored in the electricity storage unit.

14. The electricity use method according to claim 11, further comprising:
 instructing, based on a determination that the current time is the transmission/reception timing, the electricity storage unit to discharge the electricity to be supplied to the functional unit, by the state detector.

15. The electricity use method according to claim 14, further comprising:
 instructing, by the state detector, (i) the functional unit to be activated and (ii) the switch to output a next optical signal.

* * * * *